(12) United States Patent
Peltokorpi

(10) Patent No.: US 8,265,633 B2
(45) Date of Patent: Sep. 11, 2012

(54) MOBILE COMMUNICATION TERMINAL AND METHOD THEREFORE

(75) Inventor: Mika Peltokorpi, Nokia (FI)

(73) Assignee: Nokia Corporation, Espoo (FI)

( * ) Notice: Subject to any disclaimer, the term of this patent is extended or adjusted under 35 U.S.C. 154(b) by 124 days.

(21) Appl. No.: 11/463,609

(22) Filed: Aug. 10, 2006

(65) Prior Publication Data

US 2008/0039100 A1 Feb. 14, 2008

(51) Int. Cl.
*H04W 72/00* (2009.01)
(52) U.S. Cl. .............. 455/445; 455/403; 455/422.1; 370/216; 370/238; 370/351
(58) Field of Classification Search .............. 455/455, 455/405–409, 404.2, 414.1, 415, 418, 422.1, 455/425, 433–453, 461, 456.1; 370/485, 370/395.3, 207; 379/355.01–356.01
See application file for complete search history.

(56) References Cited

U.S. PATENT DOCUMENTS

| | | | |
|---|---|---|---|
| 5,991,639 A * | 11/1999 | Rautiola et al. | 455/414.1 |
| 6,741,848 B2 * | 5/2004 | Timonen et al. | 455/405 |
| 6,829,339 B1 * | 12/2004 | Kunugi et al. | 379/114.17 |
| 6,963,640 B1 * | 11/2005 | Manning | 379/355.08 |
| 7,356,337 B2 * | 4/2008 | Florence | 455/432.2 |
| 2002/0039892 A1 | 4/2002 | Lindell | 455/151.4 |
| 2002/0058494 A1 * | 5/2002 | Timonen et al. | 455/405 |
| 2003/0007482 A1 * | 1/2003 | Khello et al. | 370/352 |
| 2003/0143996 A1 | 7/2003 | Peglion | 455/432 |
| 2004/0142689 A1 * | 7/2004 | Boda | 455/432.1 |
| 2004/0264427 A1 | 12/2004 | Jaakkola et al. | 370/338 |
| 2005/0176411 A1 * | 8/2005 | Taya et al. | 455/414.1 |
| 2006/0068786 A1 * | 3/2006 | Florence | 455/435.2 |
| 2006/0177043 A1 * | 8/2006 | Li et al. | 379/355.08 |

* cited by examiner

*Primary Examiner* — Jean Gelin
*Assistant Examiner* — Chuong A Ngo
(74) *Attorney, Agent, or Firm* — Alston & Bird LLP

(57) ABSTRACT

Control of setup of international calls in a mobile communication terminal is performed. The terminal is connected to a first mobile communication network that is operated by a first operator, and the method includes detecting a request to setup an international call, the request including a first symbol sequence including a country code and a subscriber identifier, selecting, in response to the detection, an operator prefix number, the operator prefix number specifying a second operator of a communication network that provides an international call setup service, creating a second symbol sequence including the operator prefix number, the country code and the subscriber identifier, and requesting a call setup with the subscriber via the second operator, the request including transmitting the second symbol sequence to the first mobile communication network.

10 Claims, 2 Drawing Sheets

MOBILE COMMUNICATION TERMINAL AND METHOD THEREFORE

FIELD

The disclosed embodiments relate to a method for controlling international call setup in a mobile communication terminal, a mobile communication terminal and a computer program performing such a method.

BACKGROUND

Even if the cost of making calls in mobile telephone networks have decreased, from a subscriber point of view, there still exist large differences in pricing between different network operators. This is especially evident for international calls. A subscriber, located in a home country, wishing to make a call from his/her mobile telephone to another subscriber who is located in another country, different from the home country, must be prepared to accept that the charge for such a call in many cases is several times the amount of a call to a subscriber within the home country.

The fact that there now exists, in most countries, a multitude of different operators of mobile communication networks has led to a situation in which the operators compete with each other by offering subscriber different deals, including discount rates for international calls. For example, the use of selected operator prefix numbers makes it possible, for a subscriber wishing to setup an international call, by prefixing the country code, the area code and the subscriber number with the operator prefix number to have the call being setup by the selected operator.

An example of a prior art method of selecting a mobile communication network or a service in such a network is described in US patent application publication 2002/0039892. A network and service selector function receives a request for access to a network and may use pre-selected user preferences when deciding which network to use. Such user preferences include the cost of using the network.

Drawbacks with prior art methods include that a user wishing to take advantage of a specific operator when making an international call need to know specific operator prefix numbers when placing the international call.

Moreover, associations having a plurality of users, e.g. employees of a company, may wish to restrict the users when placing international calls to make the calls via a specific international operator, designated by the employer of the users.

SUMMARY

In a first aspect, a method in a mobile communication terminal is provided where the terminal is connected to a first mobile communication network being operated by a first operator. In one embodiment the method comprises detecting a request to setup an international call, the request comprising a first symbol sequence including a country code and a subscriber identifier, selecting, in response to the detection, an operator prefix number, said operator prefix number specifying a second operator of a communication network that provides an international call setup service, creating a second symbol sequence comprising the operator prefix number, the country code and the subscriber identifier, and requesting a call setup with said subscriber via said second operator, the request comprising transmitting the second symbol sequence to the first mobile communication network.

The selection of an operator prefix number may involve selection from a list comprising at least one operator of communication network. The list may comprise at least two operators of a respective communication network associated with a respective country code and wherein said selection of an operator prefix number involves selection depending on the detected country code.

Prior to detecting a request to setup an international call, reception of at least one operator prefix number for use in creating said second symbol sequence may be effectuated.

The reception of the at least one operator prefix number may involve reception of user input via a user interface in the terminal.

The reception of the at least one operator prefix number may further involve reception via any of keypad input, a wireless data interface as well as a wired data interface. For example, when synchronizing the terminal with a computer in a LAN, using a wired connection or a wireless connection (Bluetooth, Infrared, WLAN etc.), settings of operator prefixes may be performed.

The reception of the at least one operator prefix number may furthermore involve reception via said first mobile communication network; for example reception from said first operator.

In a second aspect, a mobile communication terminal is provided, the terminal being connected to a first mobile communication network being operated by a first operator, the terminal being configured to detect a request to setup an international call, the request comprising a first symbol sequence including a country code and a subscriber identifier, select, in response to the detection, an operator prefix number, said operator prefix number specifying a second operator of a communication network that provides an international call setup service, create a second symbol sequence comprising the operator prefix number, the country code and the subscriber identifier, request a call setup with said subscriber via said second operator, the request comprising transmitting the second symbol sequence to the first mobile communication network.

In a third aspect, the a computer readable medium is provided, comprising computer readable software instructions that, when executed in a computing apparatus, performs the method as discussed above.

In a fourth aspect, a method in a system is provided, said system being configured to control a mobile communication system, the method comprising transmitting information regarding operator at least one prefix number for use in a mobile communication terminal when performing the method wherein the reception of the at least one operator prefix number involves reception via said first mobile communication network.

In a fifth aspect, a system is configured to control a mobile communication system, and further configured to transmit information regarding operator at least one prefix number for use in a mobile communication terminal according to the second aspect.

In a sixth aspect, a computer readable medium is provided comprising computer readable software instructions that, when executed in a computing apparatus, performs the method in the system according to the fourth aspect.

An advantage of the disclosed embodiments is that it relieves a user of having to always remember specific operator prefixes when placing international calls. Moreover, by presetting one or more international call operators, associated with a respective country code, a user may take advantage of being able to use different operators when placing calls to different countries, without having to remember specific operator prefixes.

Another advantage of the disclosed embodiments is that it allows an associations having a plurality of users, e.g. employees of a company, to restrict the users when placing international calls to make the calls via one or more specific international operator with whom the association has made agreements regarding call charges etc.

PREFERRED EMBODIMENTS

Figure 1:
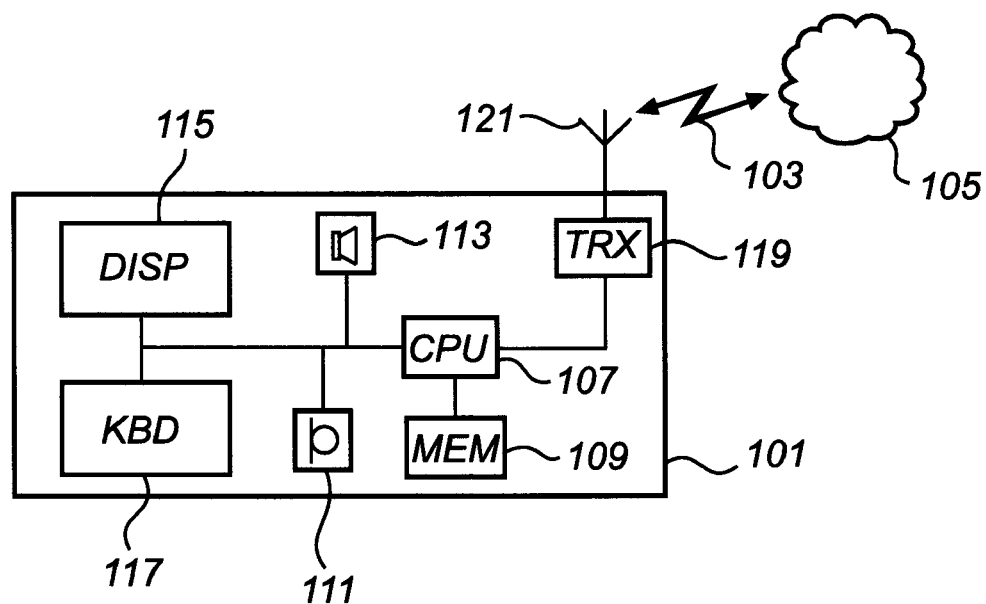
FIG. 1 shows schematically a block diagram of a communication terminal according to one embodiment.

FIG. 1 illustrates schematically a communication terminal 101 in which one embodiment is implemented. The terminal 101 is capable of communication via an air interface 103 with a radio communication system 105 such as the well known systems GSM/GPRS, UMTS, CDMA 2000 etc. The terminal comprises a processor 107, memory 109 as well as input/output units in the form of a microphone 111, a speaker 113, a display 115 and a keyboard 117. Radio communication is realized by radio circuitry 119 and an antenna 121. The details regarding how these units communicate are known to the skilled person and is therefore not discussed further.

The communication terminal 101 may for example be a mobile telephone terminal or a PDA equipped with radio communication means. The method according to the present invention will in general reside in the form of software instructions, together with other necessary software components such as operating system software, in the memory 109 of the terminal. Provision of the software instructions to the terminal 101 may be realized by providing a computer readable medium comprising the instructions. Such computer readable medium may be in the form of, e.g., a disk (CD, hard disk, diskette etc.) as well as any other storage device including flash memory and the like.

Figure 2:
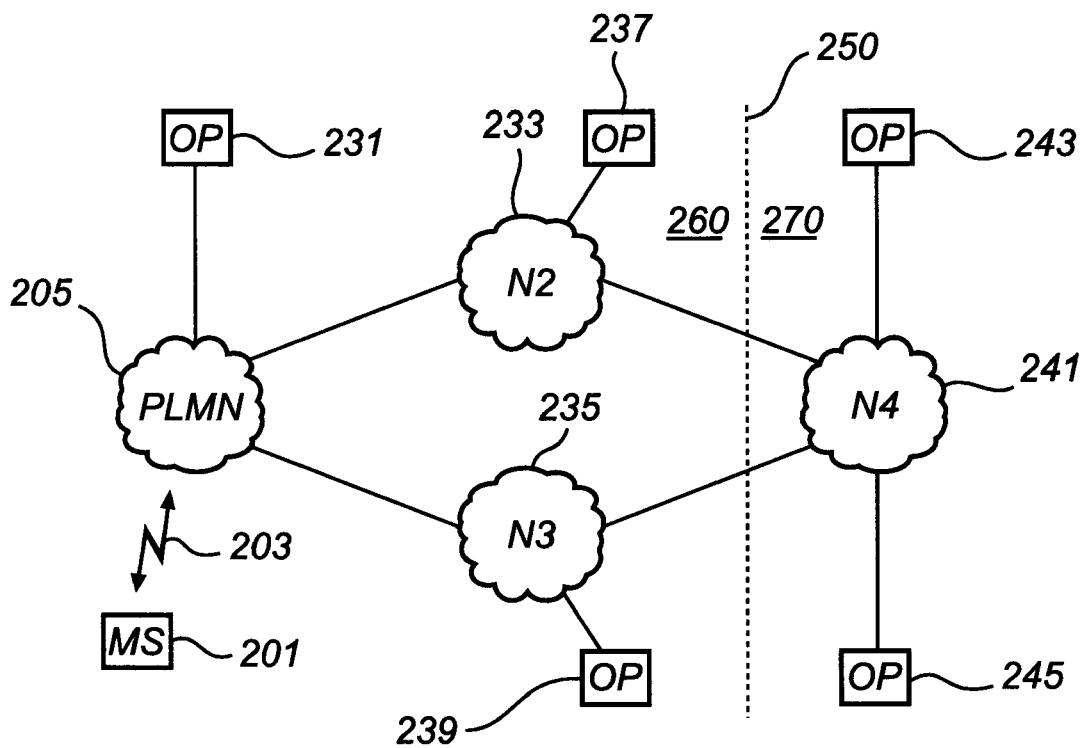
FIG. 2 shows schematically a block diagram of communication networks in which the disclosed embodiments may be implemented.

FIG. 2 illustrates schematically interconnected communication networks wherein the disclosed embodiments may be implemented. A mobile communication terminal 201, for example a terminal such as the one described in connection with FIG. 1, is connected via an air interface 203 to a first mobile communication network 205 that is operated under control of a first operator, which is schematically illustrated by a first network control system 231. Although not shown in detail, the system 231 comprises processors and memory arrangements as well as hardware and software components that are configured to control the mobile communication network 250 to transmit information, including information regarding operator prefix numbers, to mobile communication terminals.

Connected to the first mobile communication network 205 is a second communication network 233 and a third communication network 235. The second and third networks 233, 235 are operated under control of a second network operator 237 and a third network operator 239, respectively. The second and third network operators 237, 239 each serve the first network 205 (i.e. users of communication terminals connected to the first network 205) by providing communication connections with other communication networks located in a second country 270, other than a first country 260 in which the first, second and third networks 205, 233, 235 are located. Such another, international, network is illustrated in FIG. 2 by a fourth communication network 241 being operated under control of a fourth operator 243 and serving communication terminals, exemplified by a subscriber terminal 245. An international border 250 is illustrated, separating the first country 260 from the second country 270.

Figure 3:
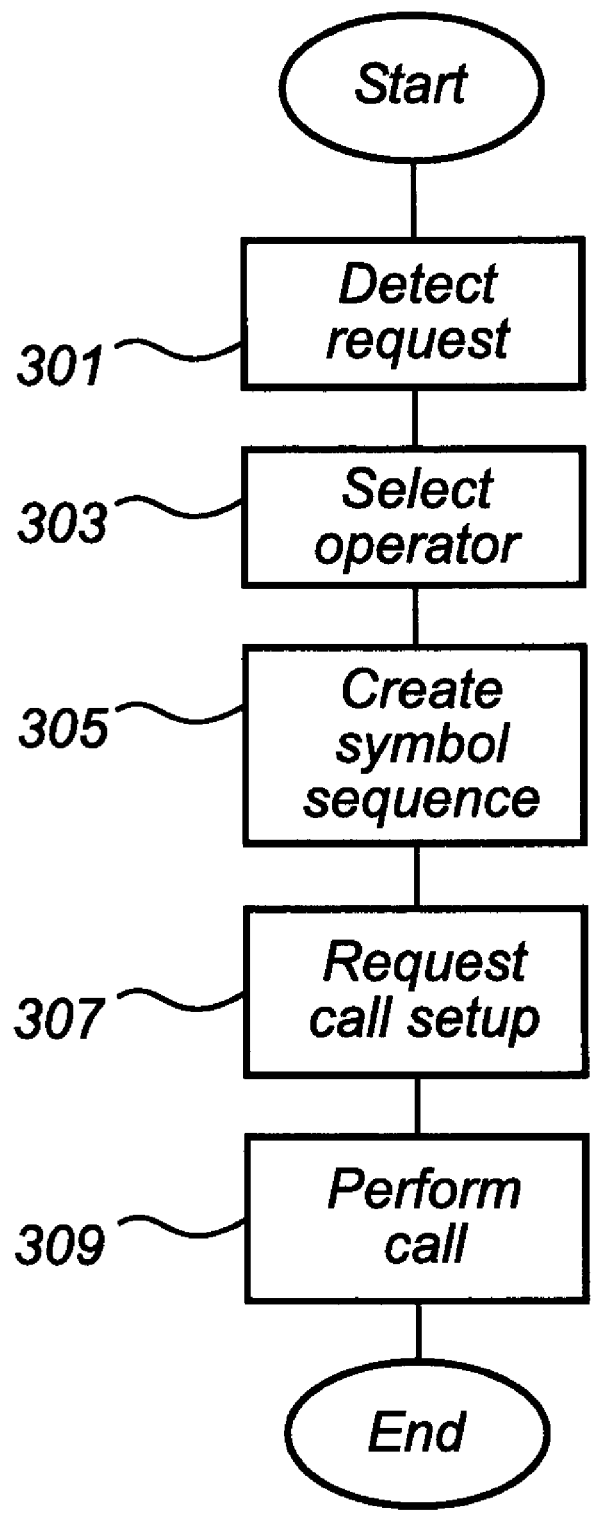
FIG. 3 is a flow chart illustrating a number of steps of a method according to one embodiment.

Turning now to FIG. 3 and with reference also to the interconnected networks illustrated in FIG. 2, a method according to one embodiment will be described in terms of a number of steps taken by controlling software in the first communication terminal 201 described above in connection with FIG. 2. FIG. 3 is a flow chart of the method and begins with a detection step 301 during which a request is detected to setup an international call from the first communication terminal 201 to the second communication terminal 245. The request comprises a first symbol sequence including a country code and a subscriber identifier. For example, the first symbol sequence may be "+1 123 456789", where the sub-sequence "+1" denotes that an international call, to the USA and other countries, is requested. The fact that an international call is requested is established when comparing the sub-sequence "+1" with the country code for the first communication network 205. The sub-sequence "123" is the area code for the desired receiving subscriber having a subscriber identifier, i.e. a subscriber number, which is "456789". Typically, the request is initiated by a user of the first terminal when using a keypad dialing the first symbol sequence.

In response to the request detection in step 301, an operator prefix number is selected, in a selection step 303, that specifies a second operator of a communication network that provides an international call setup service. The selection of the operator prefix number is typically performed by consulting a previously stored list of operator prefixes. The list may have been created by a user when storing preferred prefixes as part of a procedure where the user enters symbols via a user interface in the terminal 201. The list of operator prefixes may also be created during a procedure where the prefixes are received from, e.g., the first operator 231 or any other entity having access to the terminal 201, via the first network 205 or otherwise such as when synchronizing the terminal 201 with a computer in a LAN (not shown), using a wired connection or a wireless connection (Bluetooth, Infrared, WLAN etc.). The list of operator prefixes may comprise any number of prefixes and different operator prefixes may be associated with different country codes.

When the selection of which operator/network to use for performing the requested international call has been made, in the selection step 303, a second symbol sequence is created in a creation step 305. The second symbol sequence comprises the selected operator prefix number, the country code and the subscriber number. For example, in a case where the operator prefix number "990" has been selected, the sub-sequence "+1" of the first symbol sequence is replaced by the sub-sequence "990 1" and the second symbol sequence hence becomes "990 1 123 456789".

Then, in a request step 307, the international call to the second terminal 245 is requested via the second network 233 operated by the second operator having the selected operator prefix number.

The call is then established and performed in a perform call step 309.

The invention claimed is:

1. A method comprising in a mobile communication terminal:

detecting a request for the mobile communication terminal to setup an international call from a home country of the mobile communication terminal to another country, the request comprising a first symbol sequence including a country code of said other country and a subscriber identifier, in response to the detection, automatically selecting an operator of a communication network that provides an international call setup service from a plurality of operators by selecting an operator prefix number for the selected operator, wherein the operator of the international call setup service and associated operator prefix number are selected on the basis of the detected country code to which the international call is requested to be set up, creating a second symbol sequence comprising the selected operator prefix number, the country code and the subscriber identifier, and requesting a call setup with said subscriber via said the selected operator, the request comprising causing transmission of the second symbol sequence to a first mobile communication network.

2. The method according to claim 1, wherein said selection of an operator prefix number involves selection from a list comprising the plurality of operators.

3. The method according to claim 2, wherein said list comprises at least two operators of a respective communication network associated with a respective country code.

4. The method according to claim 1, further comprising:
receiving, prior to detecting a request to setup an international call, at least one operator prefix number for use in creating said second symbol sequence.

5. The method according to claim 4, wherein said reception of the at least one operator prefix number involves reception of user input via a user interface in a terminal.

6. The method according to claim 4, wherein said reception of the at least one operator prefix number involves reception via any of:
keypad input,
a wireless data interface, and
a wired data interface.

7. The method according to claim 4, wherein said reception of the at least one operator prefix number involves reception via said first mobile communication network.

8. The method according to claim 7, wherein the reception via said first mobile communication network involves reception from an operator of the first mobile communication network.

9. An apparatus comprising a processor and a memory storing computer-readable instructions, wherein the memory and stored computer-readable instructions are configured, with the processor, to cause the apparatus to at least:
detect a request for the apparatus to setup an international call from a home country of the apparatus to another country, the request comprising a first symbol sequence including a country code of said other country and a subscriber identifier, automatically select, in response to the detection, an operator of a communication network that provides an international call setup service from a plurality of operators by selecting an operator prefix number for the selected operator, wherein the operator of the international call setup service and associated operator prefix number are selected on the basis of the detected country code to which the international call is requested to be set up, create a second symbol sequence comprising the selected operator prefix number, the country code and the subscriber identifier, and request a call setup with said subscriber via said the selected operator, the request comprising causing transmission of the second symbol sequence to the first mobile communication network.

10. A non-transitory computer readable medium storing computer readable software instructions that, when executed in a computing apparatus, performs a method comprising:
detecting a request for a mobile communication terminal to setup an international call from a home country of the mobile communication terminal to another country, the request comprising a first symbol sequence including a country code of said other country and a subscriber identifier, in response to the detection, automatically selecting an operator of a communication network that provides an international call setup service from a plurality of operators by selecting an operator prefix number for the selected operator, wherein the operator of the international call setup service and associated operator prefix number are selected on the basis of the detected country code to which the international call is requested to be set up, creating a second symbol sequence comprising the selected operator prefix number, the country code and the subscriber identifier, and requesting a call setup with said subscriber via said the selected operator, the request comprising causing transmission of the second symbol sequence to a first mobile communication network.

* * * * *